Patented Apr. 7, 1925.

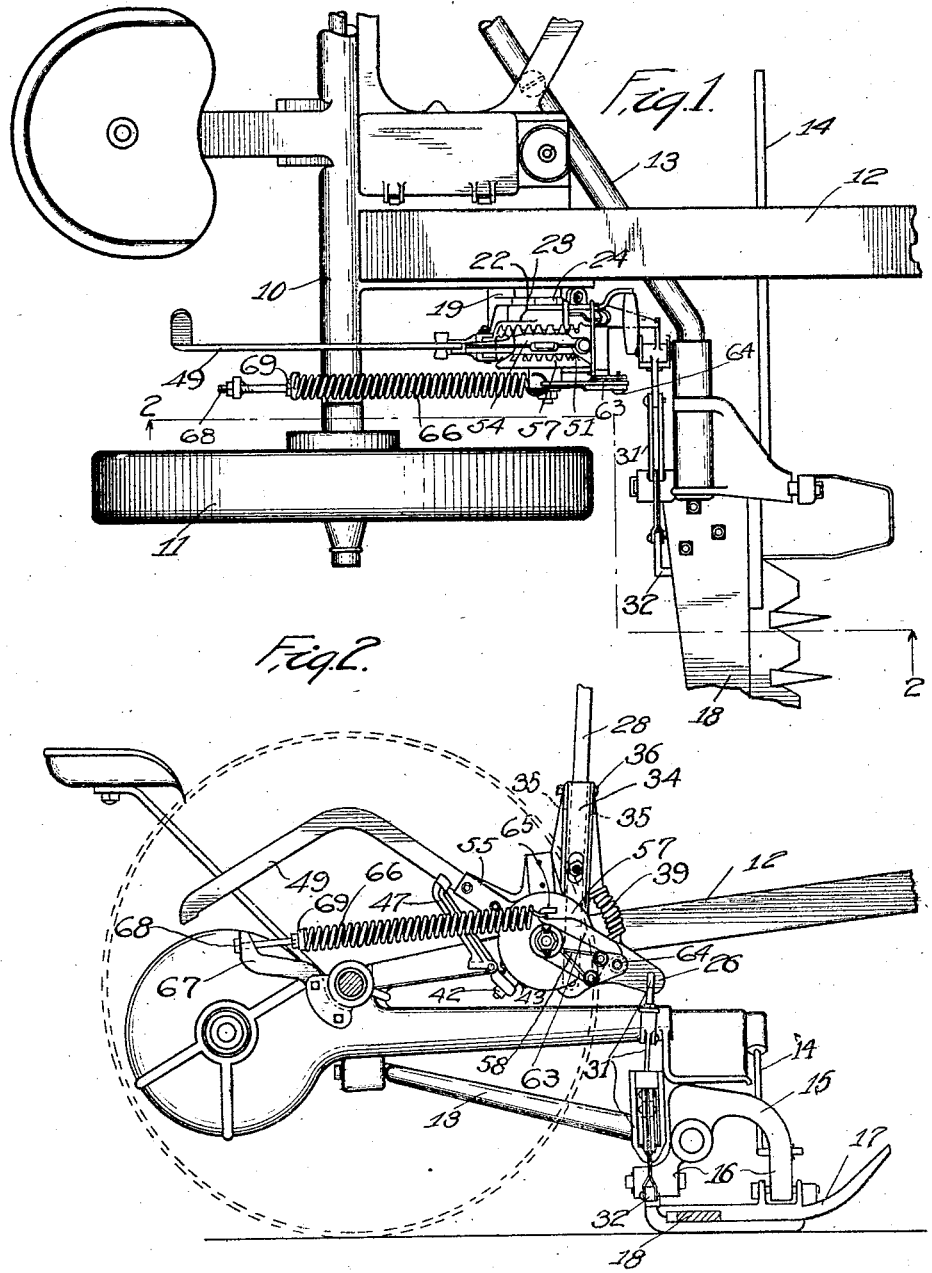

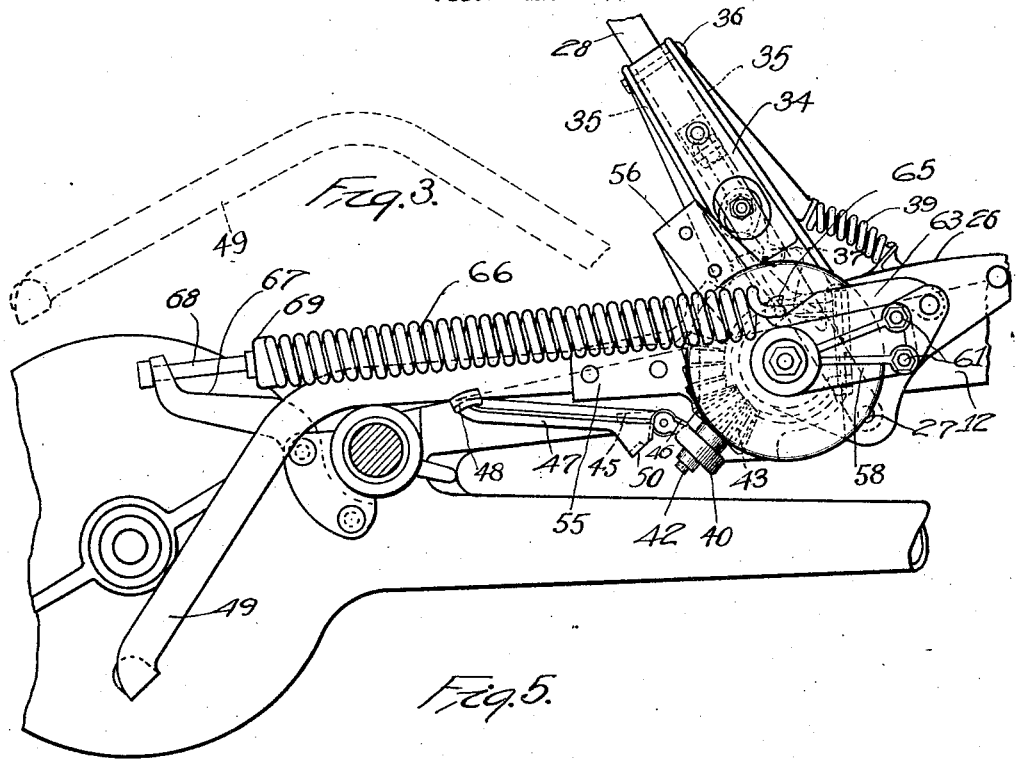
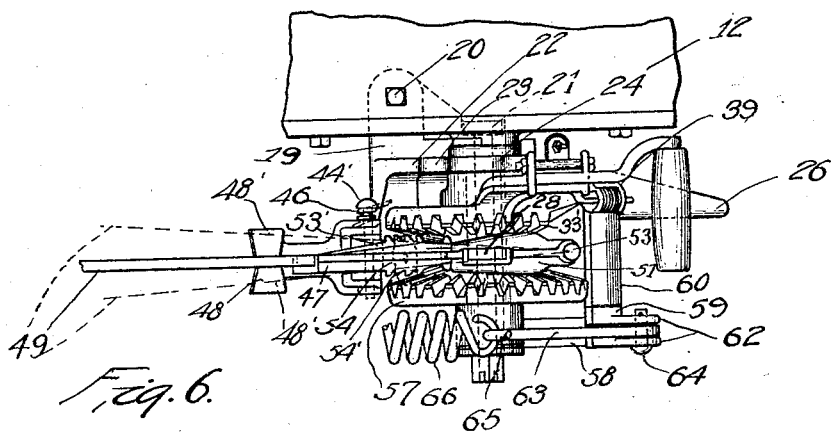
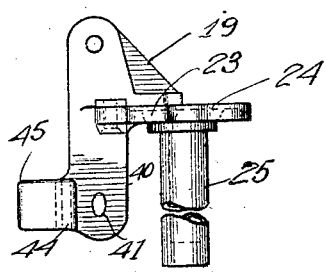
Inventor:-
Charles Pearson
John P Smith
By       Atty.

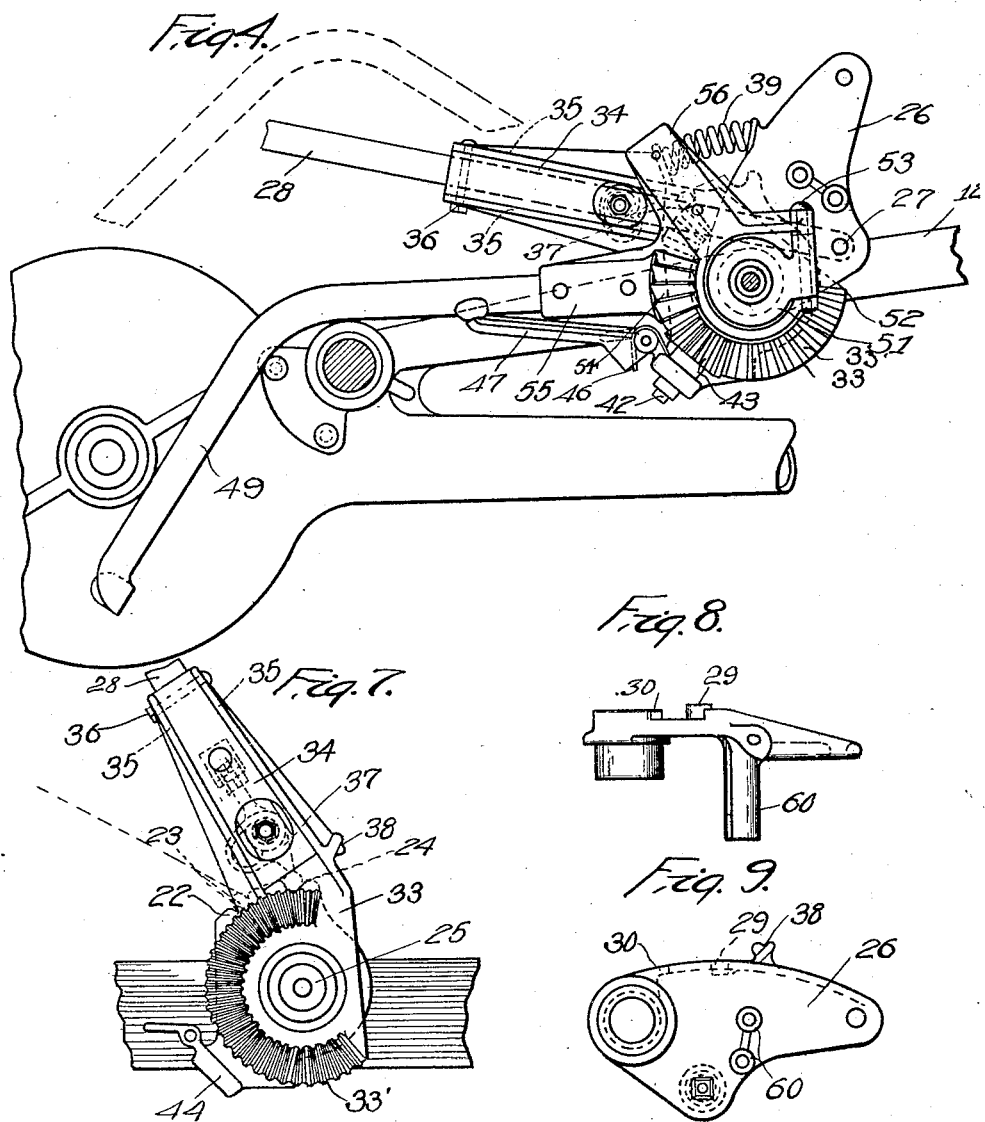

1,533,028

UNITED STATES PATENT OFFICE.

CHARLES PEARSON, OF CHICAGO, ILLINOIS, ASSIGNOR TO INTERNATIONAL HARVESTER COMPANY, A CORPORATION OF NEW JERSEY.

MOWER.

Application filed June 12, 1920. Serial No. 388,688.

*To all whom it may concern:*

Be it known that I, CHARLES PEARSON, a citizen of the United States, residing at Chicago, in the county of Cook and State of Illinois, have invented certain new and useful Improvements in Mowers, of which the following is a full, clear, and exact specification.

This invention relates to mowing machines and more particularly to mechanism for adjusting the cutter bar in an improved manner.

One of the objects of the invention is to provide an improved lever adjusting mechanism.

A further object is to provide a device which will lock the cutter bar in intermediate positions and from these positions be either raised or lowered by depressing a lever.

A still further object is to provide a reversible lever mechanism for adjusting the cutter bar.

These and other objects are attained by providing improved means for adjusting the cutting mechanism. More specifically stated, the invention in the present instance comprises a manually reversible mechanism, such, for instance, as two oppositely disposed gears engageable with a lever mechanism for adjusting the cutter bar.

The invention consists in general of certain novel details of construction and combination of parts hereinafter fully described, and illustrated in the accompanying drawings.

In the accompanying drawings, like characters of reference indicate like parts throughout the several views, and—

Figure 1 is a top plan view of a part of a mower embodying my invention;

Fig. 2 is a vertical sectional view taken on the lines 2—2 in Fig. 1 looking in the direction of the arrows;

Fig. 3 is an enlarged detail view showing the position of the different parts in the first position of adjustment;

Fig. 4 is an enlarged detail view showing the position of certain parts when the cutter bar is raised to vertical position;

Fig. 5 is an enlarged detail view showing the construction of the reversible gearing mechanism;

Fig. 6 is an enlarged detail plan view of the bracket member which supports the lifting mechanism.

Fig. 7 is a side elevational view of the hand lever and locking pawl, and

Figs. 8 and 9 are plan and side elevational views respectively of the lifting arm.

The mowing machine shown comprises the usual main frame 10 mounted on the carrying wheels 11 having the draft tongue 12, a coupling bar 13, a supplemental coupling bar 14, a rocking coupling yoke 15 carried by the grassward end of the main coupling bar and having depending arms 16 which are pivotally connected to the shoe 17 and a finger bar 18. The frame 10 has securely fixed adjacent one side of the tongue 12 a bracket member 19, by means of bolts 20 and 21. The bracket member 19 is provided with a vertically disposed toothed sector 22 having a rearward notch 23 and a forward notch 24 for the purposes hereinafter more fully set forth. Laterally extending from this sector 22 is a bearing stud 25 formed integrally therewith which pivotally carries the usual lifting arm 26.

Pivoted to the lifting arm 26 at 27 is a lever 28 which is limited in its pivoted movement with respect to the arm 26 by the forward and rearward stop portions 29 and 30 respectively on the arm 26 (see Figs. 8 and 9). The lifting arm 26 is connected to the cutter bar 18 in the usual manner by means of common form of links 31 and lever extension 32 formed integrally with the shoe 17. Pivotally mounted on the bearing member 25 adjacent one side of the lifting arm 26 is a semicircular bevel gear member 33 having teeth 33′ and an up-standing arm 34 which has two stubblewardly extending ribs 35 forming a socket for loosely receiving the lever 28 which is held within the socket by a bolt 36. The lever 28 is further provided with a freely rotatable gravity pawl 37, the free end of which is adapted to engage the notches 23 and 24 of the sector 22. For a more detailed description of the locking mechanism above described see my Patent #1,237,689, August 21, 1917.

The up-standing arm 34 and the lifting arm 26 are provided with two oppositely disposed projections 38 adapted to position a spring 39 therebetween. This spring 39 normally forces the arm 34 rearwardly with respect to the arm 26 and thereby carries the lever 28 rearwardly about the pivot 27 until it engages the stop 30 on the lifting arm 26.

The bracket 19 is further provided with a grasswardly extending member 40 having an aperture 41 for the reception of the stud 42 which forms the bearing for a bevel pinion 43. The pinion 43 is geared to the semicircular gear member 33. Just above the member 40 is a horizontally disposed bearing portion 44 and stop 45.

Pivotally supported by means of a bolt 44' on the bearing 44, and normally forced upwardly by a spring 46, is a lever guide arm 47. The free end of this guide arm is provided with a V-shaped portion 48 having laterally extending ears 48' which engages a foot lever 49 for the purposes hereinafter more fully set forth. The arm 47 is limited in its upward movement by a stop 50, which engages the stop 45 of the bracket 19 (see Figs. 3, 5 and 6).

Pivotally mounted on the bearing 25 adjacent the grassward side of the semicircular gear member 33 is a pivot bracket 51 having a vertically disposed barrel portion 52. (See Figs. 4 and 5.) Pivotally mounted for lateral movement on this barrel portion 52 is a gear engaging member 54 having oppositely disposed teeth 53' and 54' for the purposes hereinafter set forth.

This member 54 is provided with a circular recess loosely embracing the bracket 51 and pivotally secured to the barrel portion 52 by means of a bolt 53. The free end of the gear engaging member 54 is further provided with a socket 55 which is adapted to receive a foot lever 49 and also with an additional socket 56 in which a hand lever may be inserted and operated in place of the foot lever 49.

Journaled on the bearing 25 and in mesh with the pinion 43 is a bevel gear 57. Adjacent the grassward side of this gear 57 and pivotally mounted on the bearing 25 is a sector 58 having its free end 59 connected by means of a bolt 61 to a stud 60 formed integrally with the lifting arm 26. The forward end of this sector 58 is further provided with a bifurcated portion 62 adapted to receive a link 63 pivotally connected thereto by means of a pin 64. The free end of the link 63 is provided with a hook 65 which is connected to the usual balancing spring 66, the rear end of which is adjustably connected to the frame 10 in the usual manner by the bracket 67, adjusting bolt 68 and collar 69.

From the above description, it will be noted that the foot lever 49 is movable laterally about the pivot 53 from the normal position (shown in full lines in Fig. 5) to either of the dotted line positions, in which positions, the teeth 53' or 54' engage the teeth of the semicircular gear 33 or bevel gear 57 respectively.

A brief description of the operation of the above described construction will now be given:

If the operator desires to raise the cutter bar from normal cutting position (see Fig. 2) to the intermediate position (see Fig. 3) the foot lever 49 is deflected stubblewardly about the pivot 53 to the dotted line position (shown in Fig. 5), causing the teeth 53' of the gear engaging member to engage the teeth 33' of the semicircular gear 33, and when the foot lever 49 is depressed from the dotted line position to the full line position shown in Fig. 3, the hand lever 28 and lifting arm 26 is rotated counter-clockwise until the gravity pawl 37 on the lever 28 engages the notch 23 of sector 22 and thereby lock cutter bar 18 in intermediate position. It will be noted that when the operator relieves the pressure on the foot lever 49, it is automatically returned to neutral and normal position; that is, disengaged from the gear teeth 33' and raised to the dotted line position shown in Fig. 4 ready to be depressed for the next adjustment of the cutter bar. In this connection it is to be noted that the lever guide 47 is spring-pressed upwardly into engagement with the lever 49 and normally holds the lever 49 in neutral position, by reason of the V-shaped portion 48 on the guide lever 47.

If the operator desires to raise the cutter bar from the intermediate position shown in Fig. 3 to the vertical position shown in Fig. 4 the above operation is repeated and the gravity pawl 37 will engage the rear notch 23 and lock the cutter bar in vertical position. The unlocking of the gravity pawl 37 and the lowering cutter bar from the intermediate or vertical position to operative or cutting position is accomplished by deflecting the foot lever 49 grasswardly about the pivot 53 until the teeth 54' engage the teeth of the gear 57. Then upon depressing the foot lever 49, the gear 57 is rotated in a counterclockwise direction and thereby through the pinion 43, the semicircular gear member 33 is rotated in a clockwise direction.

The initial part of this rotation causes the semicircular gear member 33 and its arm 34 to rotate on the bearing member 25 and move relative to lifting arm 26, thus compressing the spring 39 and swinging the hand lever 28 about its pivot 27 and thereby releasing the gravity pawl 37 from the notch 24. This unlocks the lifting arm 26 so the same may be lowered to the position shown in Fig. 2 which is the normal cutting position of the cutter bar.

It will be noted from the construction above described that two successive depressions of the foot lever 49 will raise the cutter bar from horizontal position to vertical position and also that one depression of the foot lever will lower the cutter bar from either the vertical or intermediate positions to the cutting position.

While I have described in this application one form which my invention may assume in practice, it is, of course, to be understood that the form shown herein is chosen for the purposes of illustration and that the invention may be embodied in other forms without departing from its spirit.

What I claim as my invention and desire to secure by Letters Patent is:

1. A mower including in combination a frame, a cutting mechanism pivotally connected to said frame, a lifting mechanism for said cutting mechanism, a lever for adjusting said lifting mechanism, and manually controlled means for reversing the operating effect of said lever.

2. A mower including in combination a frame, a cutting mechanism pivotally connected to said frame, a lifting mechanism, for said cutting mechanism, a lever for adjusting said lifting mechanism, and manually controlled means including oppositely disposed gears for reversing the operating effect of said lever.

3. A mower including in combination a frame, a cutting mechanism pivotally connected to said frame, a lifting mechanism for said cutting mechanism, a lever for adjusting said lifting mechanism and manually controlled means including oppositely disposed gears engageable with said lever for reversing the operating effect of said lever.

4. A mower including in combination a frame, a cutting mechanism pivotally connected to said frame, a lifting mechanism for said cutting mechanism, and means including oppositely disposed gears and a laterally deflectable lever engageable with said gears for adjusting said lifting mechanism.

5. A mower including in combination a frame, a cutting mechanism pivotally connected to said frame, a lifting mechanism for said cutting mechanism, and reversible means including oppositely disposed gears and a laterally deflectable lever engageable with said gears for adjusting said lifting mechanism.

6. A mower including in combination a frame, a cutting mechanism pivotally connected to said frame, a lifting mechanism for said cutting mechanism, oppositely disposed gears engageable with a lever for adjusting said lifting mechanism, and means for normally holding said lever disengaged from said gears.

7. In a mowing machine, a frame, a cutting mechanism pivotally connected to said frame, an adjusting mechanism for said cutting mechanism, and a laterally deflectable and vertically adjustable lever for adjusting said cutting mechanism.

8. In a mowing machine, a frame, a cutting mechanism pivotally connected to said frame, an adjusting mechanism for said cutting mechanism, and a lever movable in a horizontal and vertical plane for adjusting said cutting mechanism.

9. In a mowing machine, a frame, a cutting mechanism pivotally connected to said frame, a gearing mechanism carried by said frame for adjusting said cutting mechanism, a lever pivoted to said frame and engageable with said gearing mechanism, and means for normally retaining said lever disengaged from said last named mechanism.

10. In a mowing machine, a frame, a cutting mechanism pivotally connected to said frame, a lifting arm pivoted to said frame, a lever pivoted to said lifting arm and limited in its movement relative thereto, and resilient means for normally retaining said lever in one position relative to said lifting arm.

11. In a mowing machine, a frame, a cutting mechanism pivotally connected to said frame, a lifting arm pivoted to said frame, a lever pivoted to said lifting arm and limited in its movement relative thereto, and a spring disposed between said lifting arm and said lever for normally retaining said lever in one position relative to said lifting arms.

12. In a mowing machine, a frame, a cutting mechanism pivotally connected to said frame, a lifting arm pivoted to said frame, a locking mechanism carried by said lifting arm for locking said cutting mechanism in a plurality of positions of adjustment, and a lever pivoted to said frame and operable in one direction to raise said cutting mechanism and lock same in an adjusted position and operable in the same direction to automatically unlock said cutting mechanism and lower same to operative position.

13. In a mower, a frame, a cutting mechanism pivotally connected to said frame, a bracket fixed to said frame having a laterally extending bearing member, and means including a lever mounted on said bearing member operable in one direction to raise said cutter bar and operable in the same direction to lower said cutter bar.

14. In a mower, a frame, a cutting mechanism pivotally connected to said frame, a bracket fixed to said frame having a laterally extending bearing member, and oppositely disposed gears adapted to be connected to a lever mounted on said bearing member operable in one direction to raise said cutter bar and operable in the same direction to lower said cutter bar.

15. In a mower including in combination, a frame, a cutting mechanism pivotally connected to said frame, a lifting mechanism for said cutting mechanism, a lever for adjusting said lifting mechanism, and means for reversing the operating effect of said lever.

16. In a mowing machine, a frame, cutting mechanism pivotally connected to said frame, an adjusting mechanism for said cutting mechanism, a laterally deflectable and vertically adjustable lever for adjusting said cutting mechanism, and means engaging said lever for normally preventing the lateral movement of said lever.

17. In a mowing machine, a frame, cutting mechanism pivotally connected to said frame, an adjusting mechanism for said cutting mechanism, a laterally deflectable lever for adjusting said cutting mechanism, and means engaging said lever for normally preventing the lateral movement of said lever.

18. In a mowing machine, a frame, cutting mechanism pivotally connected to said frame, an adjusting mechanism for said cutting mechanism, a laterally deflectable lever for adjusting said cutting mechanism, and spring pressed means engaging said lever for normally preventing the lateral movement of said lever.

19. In a mowing machine, a frame, a cutting mechanism pivotally connected to said frame, an adjusting mechanism for said cutting mechanism, a laterally deflectable and vertically adjustable lever for adjusting said cutting mechanism, and means for normally raising said lever.

20. In a mowing machine, a frame, a cutting mechanism pivotally connected to said frame, an adjusting mechanism for said cutting mechanism, a laterally deflectable and vertically adjustable lever for adjusting said cutting mechanism, and spring pressed means for normally raising said lever.

21. In a mowing machine, a frame, a cutting mechanism pivotally connected to said frame, an adjusting mechanism for said cutting mechanism, a laterally deflectable and vertically adjustable lever for adjusting said cutting mechanism, and means for normally raising and for preventing lateral movement of said lever.

22. In a mowing machine, a frame, a cutting mechanism pivotally connected to the frame, a pair of spaced gears carried by the frame for adjusting the cutting mechanism, a lever pivoted on the frame for downward movement between the gears and having means for operatively engaging the gears to adjust the cutting mechanism, and means engaging the lever for returning it to normal elevated position.

23. In a mowing machine, a frame, a cutting mechanism pivotally connected to said frame, a gearing mechanism carried by said frame for adjusting said cutting mechanism, a lever pivoted to said frame and engageable with said gearing mechanism, and means for normally holding said lever in an elevated position and retaining said lever disengaged from said last named mechanism.

24. In a mowing machine, a frame, a cutting mechanism pivotally connected to said frame, a gearing mechanism carried by said frame for adjusting said cutting mechanism, a lever pivoted to said frame and engageable with said gearing mechanism, and means comprising a guiding member for normally retaining said lever disengaged from said last named mechanism.

In testimony whereof I affix my signature.

CHARLES PEARSON.